Jan. 25, 1955
L. D. HUFFMAN
2,700,173
CUSHIONED CASTER
Filed Aug. 25, 1952
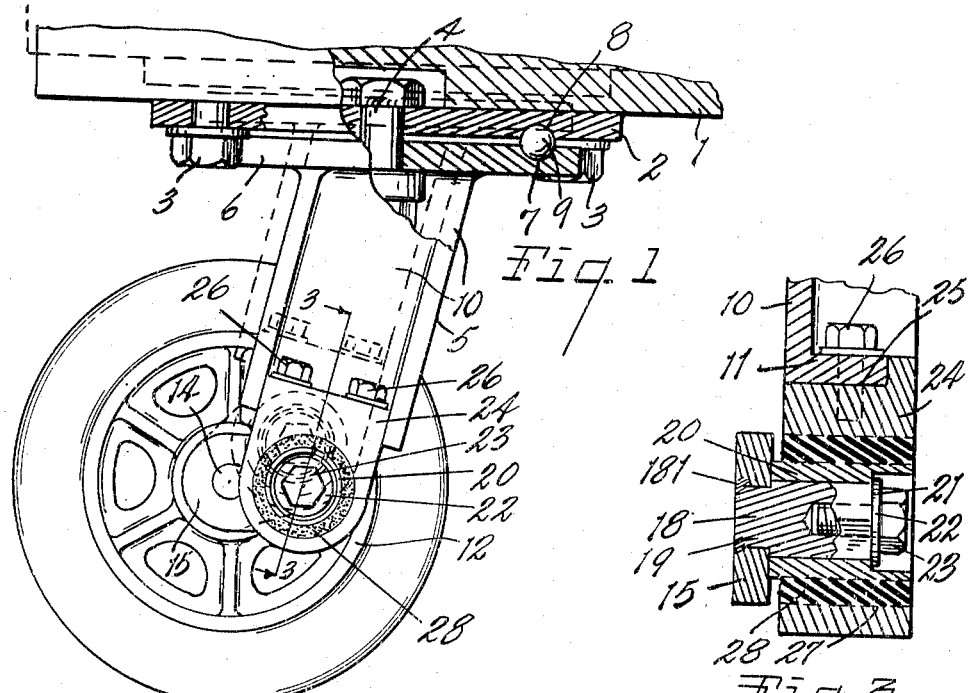
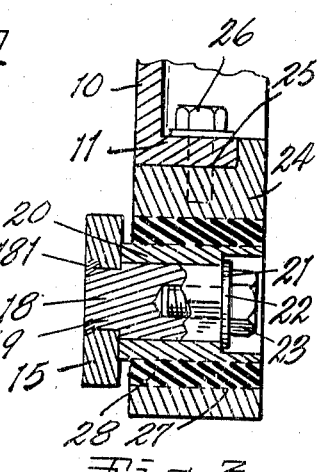
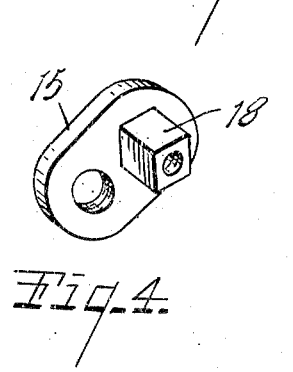
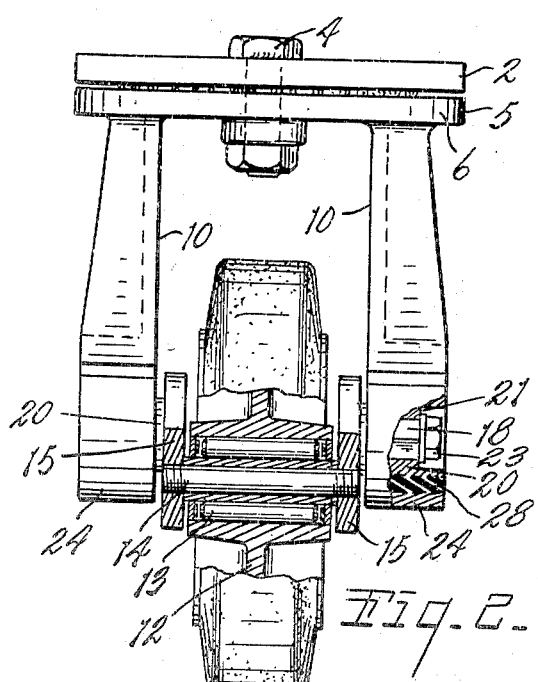
INVENTOR.
Levi D. Huffman
BY
Otis A. Earl
Attorney.

United States Patent Office 2,700,173
Patented Jan. 25, 1955

2,700,173
CUSHIONED CASTER

Levi D. Huffman, Albion, Mich., assignor to Service Castor & Truck Corporation, Albion, Mich.

Application August 25, 1952, Serial No. 306,225

3 Claims. (Cl. 16—44)

This invention relates to improvements in a cushioned caster.

The main objects of this invention are:

First, to provide a cushioned caster which is highly efficient and one in which the cushioning parts are compactly arranged and well protected from injury in use.

Second, to provide a structure of this character which may be economically produced and at the same time is strong and durable.

Objects relating to details and economies of the invention will appear from the description to follow. The invention is defined and pointed out in the claims.

A preferred embodiment of the invention is illustrated in the accompanying drawing, in which:

Fig. 1 is an elevational view partially in section and partially broken away, a loaded position of the parts being shown in full lines and the unloaded position being indicated by dotted lines.

Fig. 2 is an elevational view of the castor looking from the left of Fig. 1 with the parts broken away and shown in vertical section.

Fig. 3 is an enlarged fragmentary view on line 3—3 of Fig. 1.

Fig. 4 is a perspective view of one of the axle carrying arms.

The general purpose of the applicant's invention is twofold; one, to relieve the load of vibration and shocks, and two, to minimize wear on the surface over which the truck is operated. Pavements and the floors of factories and warehouses even if initially quite smooth soon become pitted and roughened and there are frequently substantial obstructions in the floor. Operating trucks provided with noncushioning castor wheels over such surfaces results in rapid wear and undesirable shaking of the load, and further, such trucks require an added power to pass such obstructions.

In the accompanying drawing, 1 represents the body of a truck to which the castor mounting plate 2 is secured by screws or bolts 3. This plate carries the swivelling spindle 4.

The caster of my invention, designated generally by the numeral 5, comprises a bearing plate 6 receiving the spindle 4 and provided with ball races 7 opposed to a ball race 8 in the mounting plate, the bearing balls 9 coacting with the ball races. The plate 6 carries the downwardly projecting fork arms 10 which are inclined relative to the swivelling axis of the caster and are desirably of channel section and provided with outwardly projecting flanges 11 disposed between the flanges of the fork arms. The wheel 12 is provided with a roller bearing assembly designated generally by the numeral 13 carried by the axle or shaft 14. The details of this bearing assembly form no part of my present invention and are therefore not further described.

The axle is mounted on the carrying arms 15 disposed on the inner sides of the fork arms 10. The shaft is connected to the carrying arms to prevent axial movement of the shaft relative thereto. The carrying arms 15 are fixedly secured to the outwardly projecting mounting studs 18, the arms having openings receiving the reduced portions 19 of the studs which are welded to the arms as indicated at 181. The studs are noncircular and provided with sleeves 20 which are externally cylindrical but internally shaped to nonrotatably receive the studs. The sleeves are internally shouldered at 21 to receive the abutment washers 22 with the screws 23 detachably securing the studs within the sleeves.

The fork arms include at their lower ends detachable portions in the form of wheel bracket members 24 recessed at their upper ends at 25 to seat against the flanges 11 to which they are secured by the screws 26. These bracket members have internally cylindrical openings 27 of a diameter substantially exceeding that of the sleeves. The annular torsionally resilient cushioning members 28 are disposed between the sleeves and the walls of the opening in the holder and fixedly connected to both. These torsionally resilient cushioning members are formed of rubber, either natural or synthetic or rubber composition. It should be noted that the cushioning action results from the torsional action of the cushioning members rather than from the radial cushioning. This torsional action results from the mounting of the wheels on the carrying arms so that the movement of the caster fork arms, as a result of the load under operation conditions of the character described, is absorbed by the swinging movement of the carrying arms relative to the axle. The stress imparted by such swinging is a rotating stress on the arm carrying sleeves and this is cushioned by the torsionally resilient cushioning members. The result is a highly desirable cushioning action for the caster.

I have not illustrated or described other embodiments or adaptations of my inventon which I contemplate and which might be desirable for different truck structures as it is believed that this disclosure will enable those skilled in the art to embody or adapt my invention as may be desired.

Having thus described my invention, what I claim as new and desire to secure by Letters Patent is:

1. A caster comprising a fork member having spaced fork arms, a wheel, an axle on which said wheel is mounted, carrying arms on which said axle is mounted provided at their inner ends with laterally projecting noncircular studs, stud mounting sleeves having non-circular axial passages nonrotatably receiving said studs and radially extending shoulders at the outer ends of said passages, screws engaged in the ends of said studs and bearing against said shoulders to removably secure said studs in said sleeves, said fork arms having cylindrical openings therein of a diameter substantially exceeding the diameter of the sleeves and in which the sleeves are centrally disposed, and annular torsional resilient cushioning members of uniform wall thickness disposed between said sleeves and the walls of said openings in contacting supporting relation to both and nonrotatably connected to both whereby the fork member and the load thereon are cushioningly supported by the wheel.

2. A castor comprising a swingably mountable fork member having spaced fork arms including upper parts of outwardly facing channel section which have outwardly directed flanges at their lower ends, a wheel, an axle on which said wheel is mounted, carrying arms on which said axle is mounted disposed on the inner sides of said fork arms and provided at their inner ends with outwardly projecting studs of noncircular section, said fork arms also including lower parts comprising wheel bracket members abutting and detachably secured to said flanges at the lower ends of the upper parts of said fork arms and having internal cylindrical openings therein, externally cylindrical stud mounting sleeves having noncircular axial passages nonrotatably receiving said studs and having radially extending shoulders at the outer ends of said passages, screws engaged in the outer ends of said studs and bearing against said shoulders to removably secure said studs within said sleeves, and annular torsionally resilient cushioning members of substantially uniform thickness disposed between said sleeves and the walls of said openings in said bracket members and nonrotatably connected to both.

3. A castor comprising a swingably mountable fork member having spaced fork arms, a wheel, an axle on which said wheel is mounted, carrying arms on which said axle is mounted disposed on the inner sides of said fork arms and provided at their inner ends with outwardly projecting noncircular studs, said fork arms including wheel mounting brackets at the lower ends thereof having internally cylindrical openings therein, externally cylindrical stud mounting sleeves having noncircular axial passages nonrotatably receiving said studs, means clamping said studs axially in said sleeves, and annular torsionally resilient cushioning members of substantially uniform thickness disposed between said sleeves and the walls of said openings in said bracket members and nonrotatably connected to both.

References Cited in the file of this patent

UNITED STATES PATENTS

| | | |
|---|---|---|
| 1,915,325 | Linn | June 27, 1933 |
| 2,235,605 | Bugatti | Mar. 18, 1941 |
| 2,285,656 | Herold | June 9, 1942 |

FOREIGN PATENTS

| | | |
|---|---|---|
| 579,861 | Great Britain | Aug. 19, 1946 |
| 629,434 | Great Britain | Sept. 20, 1949 |
| 880,554 | France | Mar. 30, 1943 |